United States Patent Office 3,580,841
Patented May 25, 1971

3,580,841
ULTRATHIN SEMIPERMEABLE MEMBRANE
John E. Cadotte, Roseville, and Peter S. Francis, Edina, Minn., assignors to the United States of America as represented by the Secretary of the Interior
No Drawing. Original application Jan. 31, 1967, Ser. No. 613,054. Divided and this application July 31, 1969, Ser. No. 856,516
Int. Cl. B01d 13/00, 31/00
U.S. Cl. 210—23
17 Claims

ABSTRACT OF THE DISCLOSURE

An ultrathin semipermeable reverse osmosis membrane which may be made by casting a concentrated polymer solution on a liquid surface and then evaporating, and which may be laminated with a separate porous support membrane to form a composite reverse osmosis membrane. A process of separating solvent from solution by reverse osmosis comprising bringing that solution into contact with a membrane comprising a semipermeable ultrathin membrane at a pressure above the osmotic pressure.

This is a division of application Ser. No. 613,054, filed Jan. 31, 1967, and now abandoned.

BACKGROUND OF INVENTION

(a) Field of invention

This invention pertains to the art of reverse osmosis wherein the application of greater than osmotic pressure causes solvent flow from a more concentrated solution to a more dilute solution. More especially, the invention concerns:

An ultrathin semipermeable reverse osmosis membrane;

An improved process of making an ultrathin semipermeable membrane;

A laminar composite membrane comprising an ultrathin semipermeable membrane in combination with a porous support membrane;

The process of altering the concentration of solutions by reverse osmosis using an ultrathin semipermeable membrane, and The process of altering the concentration of solutions using a laminar composite of an ultrathin semipermeable membrane and a porous support membrane.

This invention is particularly concerned with the above products and processes as they relate to the recovery of pure water from saline water sources, such as brackish waters, sea water, and acid mine waters.

(b) Description of prior art

The development of the reverse osmosis process is an outgrowth of much earlier work done on osmosis and osmotic pressure measurements. It has long been recognized that the conventional process of osmosis through a semipermeable membrane is reversible. That is to say, the flow of solvent from a more dilute solution through the membrane is pressure dependent to the extent that, if enough pressure is applied to the concentrated solution the flow may be stopped. That pressure needed to stop the flow is termed "osmotic pressure." Osmotic pressures vary with the composition and concentration of the solution, but are independent of the semipermeable membrane. In any case, if a pressure greater than osmotic pressure is applied to the more concentrated solution, the flow of solvent is reversed (hence the term "reverse osmosis"), passing in that instance from the more concentrated solution to the more dilute.

Most of the early work done in osmosis concerned the separation of water from alcohols, sugars and colloids, although varying degrees of semipermeability to salt solutions had been observed in natural membranes.

More recently, Reid and Breton found that conventional cellulose acetate had a high degree of semipermeability to salt solutions and could be used to purify saline water by reverse osmosis.[1] Still later, Loeb and Sourirajan[2] found that, by using particular preparative techniques, they could greatly increase the water permeability through cellulose acetate membranes. U.S. Pats. 3,133,132, 3,133,137 and 3,170,867 describe this method which results in what has subsequently been termed a "modified" membrane structure. This structure has been extensively studied using differential dyeing techniques[3][4] as well as electron microscopy.[5] Workers in the art have concluded that, unlike the commercial cellulose acetate material used in Reid et al., which appears fully dense and without structure,[6] the membrane formed by the casting procedure of Loeb et al. appears to have a porous gelled region and a separate dense region. The porous gelled region extends from the surface which was adjacent to the casting surface during formation through approximately 90-99% of the total membrane thickness. The remaining dense region extends to the opposite surface.[7][8] This dense nonporous (in the sense of measurable pores) region has been termed the "active" side of the modified membrane. The exact nature of the "active" side has not been determined, nor has the relation of the active side to the porous gelled side been established. It is known, however, that modified membrane exhibit asymmetry and will only show semipermeability in electrolyte solutions when the active side is adjacent the more concentrated solution.

Following the discovery of a process for fabricating modified cellulose acetate membranes, many other polymeric materials have been tested and have been found to exhibit excellent semipermeabilities for various solutions including concentrated electrolyte solutions. However, it has generally been very difficult, if at all possible, to cast these materials into an acceptable modified structure. Normally the problem is one of obtaining a high solute rejection without great sacrifice in solvent throughput. It has been found that small changes from normal casting conditions may result in exaggerated, unexpected and usually unfavorable results in membrane performance. Consequently, because of the difficulty in applying the technique of forming modified membranes to materials other than cellulose acetate, the use of other materials has been greatly restricted.

Further, even modified cellulose acetate membrane do not consistently give satisfactory results under operating conditions. These results are especially disappointing with respect to membrane lifetimes. If the membrane is to be used in a process such as the desalination of sea water where great amounts of solvent water must be separated from saline water at low cost, membrane lifetimes become a critical consideration, because replacement requires a shutdown of the process. The cause of membrane failure ---
[1] Breton, Jr., Water and Ion Flow Through Imperfect Osmotic Membranes, Office of Saline Water Research and Development Progress Report No. 16, April 1957.
[2] Ticknor, L. B., J. Phys. Chem. 62, p. 1483 (1958).
[3] Keilin, The Mechanism of Desalination by Reverse Osmosis, Office of Saline Water Research and Development Progress Report No. 117, p. 4 (1965).
[4] Banks, W., and Sharples, A., The Mechanism of Desalination by Reverse Osmosis, and Its Relation to Membrane Structure, Office of Saline Water Research and Development Progress Report No. 143, p. 8 (1965).
[5] Lonsdale et al., Reverse Osmosis for Water Desalination, Office of Saline Water Research and Development Progress Report No. 111, p. 29 (1965).
[6] Reference 5 supra at p. 57.
[7] Reference 3 supra at p. 4.
[8] Reference 4 supra at pp. 9 and 58.

has normally been attributed to a decrease in solvent flux with time at a constant pressure which in turn is caused by compaction of the porous gelled side of the modified membrane.[9]

This invention is directed at solving the above-mentioned problems which are present in the prior art. Still further advantages and utilizes of the present invention will become apparent from the following detailed description.

SUMMARY

This invention relates to a novel ultrathin semipermeable reverse osmosis membrane which may be employed in combination with a porous support. The invention is also concerned with the method of making an ultraethin semipermeable reverse osmosis membrane, and the method of using that membrane to alter the concentrations of solutions, such as saline waters.

The ultrathin membrane is an improvement over the thicker prior art modified membrane and may be constructed from materials which have been heretofore unsatisfactory when cast in modified form.

The combination of ultrathin membrane and porous support gives a laminated composite membrane product which is in some ways analogous to the prior art modified membrane but which has the advantage of containing discrete laminas which perform different functions. These separate laminas, because they are made independent of each other can each be tailored for their purpose with much more precision than can the active or porous regions of the modified membrane. Consequently, the composite represents a superior form of reverse osmosis membrane.

Accordingly, the objects of this invention are:

To provide an ultrathin semipermeable reverse osmosis membrane;

To provide a method of making an ultrathin semipermeable reverse osmosis membrane;

To provide a composite reverse osmosis membrane consisting of an ultrathin semipermeable reverse osmosis membrane together with a porous support membrane;

To provide an improved method of reverse osmosis using an ultrathin semipermeable reverse osmosis membrane;

To provide an improved process of reverse osmosis using a composite ultrathin semipermeable reverse osmosis membrane and porous support membrane, and To provide an improved means for converting saline water to fresh water.

DETAILED DESCRIPTION OF THE INVENITON

Ultrathin membrane

The ultrathin membrane of the present invention differs from prior art modified membranes in at least two aspects. First, they are not asymmetric and second, they are many orders of magnitude thinner than the prior art modified membranes. Loeb et al. in U.S. Pats. 3,133,132, 3,133,137 and 3,170,867, show that modified membranes are in the order of from 0.0025 to .0040 inch (63.5–101.6 microns) in thickness, whereas the ultrathin semipermeable membrane of the present invention are less than one micron in thickness. Broadly, a range of thickness of from about 0.05–0.50 micron is desirable with the preferred range being from about .10 to .25 micron.

The ultrathin membrane must be semipermeable possessing a favorable selectivity to the desired product solvent and a high degree of rejection toward the solute. Compositions which have semipermeabilities toward various solutions are well known in the art. This is especially true in the field of saline solutions where the Office of Saline Water and others have investigated a large number of materials and have determined their permeabilities to salt and water.

While the thickness of the membrane and its semipermeability are the most important characteristics, other art recognized measurements may be used to establish preferred properties. Two constants terms "A" and "B" have been used in the art to describe membrane properties. Constant "A" measures the permeability of the membrane to solvent and is expressed in terms of gms./cm.$^2$-sec.-atm. Thus, this measurement is an indication of solvent flux at a given pressure and is a particularly important consideration when the desired product is the pure solvent. This constant "A" has been found to be dependent on the thickness of the ultrathin membrane.

The second constant "B" measures the permeability of the membrane to solute and is expressed in terms of cm./sec. This constant while not pressure dependent, varies for individual solutes.

Constant "B" by itself is not an indication of a desirable membrane property as is the ratio of $A/B$, which is the ratio of solvent to solute permeability and is an important indication of membrane selectivity.

It should be noted that the importance of these constants depends upon the type of process in which the membrane is to be used. This is true because the requirements of selectivity and throughput will vary in different reverse osmosis applications and also because the measurement of the constants are dependent upon the type of solution being separated. In the broad sense then, these parameters reflect not only properties of the membrane but also a desired condition. Consequently, a broad definition of the ultrathin semipermeable reverse osmosis membrane of this invention cannot be expressed in terms of these constants. However, membranes designed for a specific utility may be so defined.

For example, membrane for separating solvent from aqueous saline solutions such as sea water or backish waters should have a minimum "A" value of $1 \times 10^{-6}$ gm./cm.$^2$-sec.-atm. and an $A/B$ value of at least 0.1 gm./cm.$^3$-atm. in a 3.5 percent brine at 1500 lbs./in.$^2$. These values may easily be determined by art recognized means which include a columetric analysis of product and a salt content determination such as obtained by a conductivity measurement.

Another important consideration, but not a definite limitation, on membrane structure is the absence of minimization of flaws or voids in the ultrathin membranes. These terms when used in the present context refer to imperfections in the membrane through which, under normal operating conditions, the passage of both solute and solvent is allowed without discrimination. This phenomena is normally termed viscous or hydrodynamic flow. Obviously, a flawless membrane will allow no viscous or hydrodynamic flow and in that sense is perfect. Such a membrane is rarely, if ever, practically obtainable. The upper limit on flaws or voids is a matter of compromise in each system for a number of reasons. First, some systems by reason of economics require a very high selectivity while others may require only moderate selectivity to be competitive with other separation techniques. Secondly, osmotic pressures differ with various solutions, and thirdly, the minimum size of flaws which permit viscous or hydrodynamic flow differ with solution composition. For example, in the conversion of saline water viscous or hydrodynamic flow in permitted by any flaws or voids larger than about 10 A. Still, flow through flaws or voids that small are very minimal and a much larger number of flaws of that size may be tolerated than can flaws in the range of from 0.1–3.0 microns.

If the sizes and/or number of flaws become excessive, the membrane will no longer be semipermeable because, if most of the flow through the membrane is in the nature of viscous or hydrodynamic flow, the membrane will not exhibit any significant selectivity. In that case, the membrane would exhibit a very low A/B value.

Thus, while all possible precautions in membrane preparation and handling should be taken to minimize flaws, the acceptable number and sizes of flaws will vary for ---
[9] Merton et al., Reverse Osmosis for Water Desalination, Office of Saline Water Research and Development Progress Report No. 208, p. 59 (1966).

different membrane applications for the reasons stated above. No definite number or size of flaws can be established as operating limits.

Finally, the ultrathin membranes should be dense, coherent, structurally stable and should permit a minimum of viscous flow under reverse osmosis conditions.

There are available a large number of compositions which can be fabricated into ultrathin semipermeable membranes having the properties heretofore described.

Generally, these materials will be thermoplastic or elastomeric polymers of polysaccharides. For example, we have prepared ultrathin semipermeable reverse osmosis membranes from the following polysaccharides: agar acetate, amylose triacetate, beta glucan acetate, beta glucan triacetate, cellulose acetate acetaldehyde dimethyl acetal, cellulose acetate, cellulose diacetate, cellulose triacetate, cellulose acetate ethyl carbamate, cellulose acetate methyl carbamate, cellulose acetate ethyl carbonate, cellulose acetate methyl carbonate, cellulose acetate chloroacetate, cellulose acetate ethyl oxalate, cellulose acetate methyl sulfonate, cellulose acetate propionate, cellulose acetate p-toluene sulfonate, cellulose diacetate acetyl lactate, cellulose diacetate ethyl oxalate, cellulose diacetate methoxyacetate, cellulose nitrate, cellulose nitrate methane sulfonate, cyanoethyl cellulose, ethyl cellulose dimethyl sulfamate, ethyl cellulose methane sulfonate, guar acetate, guar triacetate, hydroxyethyl cellulose triacetate, hydroxymethyl cellulose triacetate, methyl cellulose acetate, methyl cyanoethyl cellulose, triacetate of locust bean gum, xylan acetate, and cylan diacetate.

Further, membranes have also been prepared from mixtures of cellulose acetate with acetylated hydroxyethyl cellulose, cellulose acetate with sucrose octaacetate, cellulose triacetate with sucrose octaacetate, and cellulose triacetate with xylan diacetate.

Polysaccharide esters comprise a preferred group of materials. Specific preferred membrane materials for saline water conversion include cellulose acetate, cellulose diacetate, cellulose triacetate, guar triacetate, locust bean gum triacetate, beta-glucan triacetate, xylan diacetate, methyl cellulose acetate, methyl cyanoethyl cellulose, cellulose acetate methyl carbonate, cellulose acetate chloroacetate, cellulose acetate lactate, and cellulose acetate methoxy acetate.

Still further examples of useful materials have been disclosed in the literature.[10,11]

Method of making ultrathin membranes

Ultrathin semipermeable reverse osmosis membranes of the compositions and properties noted above may be prepared by one of two methods.

We have found that good ultrathin membranes may be made by casting a concentrated solution of the polymer on a liquid surface. Liquids upon which membranes have been cast include water, aqueous inorganic salt solutions, aqueous urea solutions, glycerine and mercury. One limitation on the use of any liquid is that the membrane must not be soluble in it. A number of solvents may be used to form concentrated casting solutions. The solvent should be either insoluble or sparingly soluble in the liquid over which the casting solution is to be poured. When using water as the base liquid, useful solvents include esters, ethers, ketones, alcohols, hydrocarbons, halogenated hydrocarbons, mixtures of these with each other or with small amounts of dimethylformamide or dimethylsulfoxide.

To prepare the casting solution, the polysaccharide should be dissolved in the solvent to give a solution having the consistency about equal to varnish or light syrup. This viscosity will generally be obtained by solutions of .5–25% polymer concentration and usually will be found to be in the range of 3–15% polymer. The casting solutions spread spontaneously when poured on the liquid surface. The temperature of the casting step has not been found to be critical. However, good results have been obtained when operating at about 130° F. After the solution has been cast the solvent is allowed to evaporate leaving a polymer residue in the form of a membrane. The thickness of this membrane may easily be controlled by regulating such factors as casting solution concentration and viscosity, and in some instances by manually extending or expanding the solution.

The second method of forming an ultrathin membrane has recently been described in literature.[12] This method is an adaptation of the Carnell method of preparing very thin films,[13, 14] and consists basically of slowly drawing a clean glass plate from a dilute solution of a polymer in a solvent. Solvents which may be used in this process include ketones, pyridine, dioxane, methyl acetate and mixtures of acetone with alcohols. As with the first method described, the concentration may be altered to vary the thickness of the resulting membrane. The operative concentration for a given polymer and solvent is a matter of choice and may easily be established by routine tests. It should be noted that the thickness of the membrane may also be controlled by the glass withdrawal rate.

Composite reverse osmosis membrane

We have found that the previously described ultrathin semipermeable membranes are particularly effective for reverse osmosis processes when placed in combination with a porous support. The combination is formed by separately fabricating the ultrathin membrane and a porous support and subsequently placing the two in surface to surface contact.

The function of the porous support is to protect the ultrathin membrane and to provide a solvent passage means whereby solvent may be transferred away from its downstream (low-pressure) side. The porous support must accomplish these tasks under operating conditions without creating a large back-up pressure and without harm to the delicate ultrathin membrane. To accomplish this end, the porous support must possess certain properties. It should have a pore size at the surface in contact with the ultrathin small membrane enough to support the ultrathin membrane, large enough to permit viscous flow. Pore sizes should generally be smaller than about 5000 A. and pores in the range of from about 500–2000 A. are preferred. Further, the support must be able to stand the pressures of reverse osmosis operation without bursting and without compaction which restricts flow and builds up back pressure. Finally, the porous support should be relatively thin to cut down on equipment size. Thus, porous supports will generally be in the range of from 1–20 mils with a preferred range of from 2–7 mils.

There are a number of materials presently available which may serve as porous supports. These materials include filter materials such as type VF and VM Millipore filters, which are fabricated from a mixture of cellulose nitrate and cellulose acetate, commercial cellulose triacetate filters such as Gelman Matricel GA–10, metallic membranes of silver and other materials such as those made in accordance with U.S. Pat. 3,287,112, and porous glasses, and ceramics.

---

[10] Reference 9 supra.
[11] Francis, Fabrication and Evaluation of New Ultrathin Reverse Osmosis Membranes, Office of Saline Water Research and Development Progress Report No. 177 (1966).
[12] Reference 9 supra.
[13] Carnell, P. H., J. Appl. Polymer Sci., vol. 2, p. 1863 (1965).
[14] Carnell, P. H., and H. G. Cassidy, J. Polymer Sci., vol. 55, p. 233 (1961).

Gelled porous supports of cellulose acetate and polycarbonates have been found particularly effective. To prepare these supports, an aqueous solution of polymer, organic solvent and swelling agent is case on a solid substrate and immediately immersed in ice water, with no evaporation step. After soaking for an hour or more, the gelled support may be separated from the substrate and is ready for use as is.

To form a laminated composite of an ultrathin membrane and a porous support, the individual layers are formed separately and then physically laminated. There are a variety of manipulative techniques available for laminating two thin layers.

If the ultrathin portion of the composite is formed by casting on a liquid surface, a convenient lamination procedure comprises immersing in the liquid beneath the ultrathin membrane, a porous support membrane on a substrate, bring the substrate and porous support at an angle of 45° up to the floating membrane such that one edge of the floating membrane is super-imposed on one edge of the support membrane, and then drawing the substrate, support membrane and floating membrane from the surface of the liquids at an acute angle. This procedure along with other manipulative methods for handling floating membranes have been disclosed in the literature.[15]

If the ultrathin membrane is formed by casting on a substrate, the above lamination procedure may still be followed by first floating off the ultrathin membrane onto the surface of a liquid.

Other techniques of lamination involve separate castings on substrates and subsequent physical compositing and overcasting. The latter technique will find use mainly where the porous support membrane is an inorganic material.

Once formed, the composite will find utility in all major reverse osmosis separations. To use the composite, one merely has to substitute the composite membrane for the "modified" membranes used in conventional equipment assemblies, such as shown in U.S. Pat. 3,133,132.

Normally, these assemblies include a source of pressure, and a support for the membrane. Porous back-up plates supply support for the membranes. Stainless steel, Monel, titanium, ceramic frits and Fiberglas have been used for support materials because of their strength and ability to pass water through a porous structure. A means for circulating or stirring the feed solution to minimize solute build-up at the membrane-solution interface is also usually a part of the reverse osmosis system. Using these components, a variety of devices have been designed for use in reverse osmosis and descriptions are available in the prior art.[16]

The following examples are illustrative of the present

The process of reverse osmosis is carried out when a solution is supplied to the membranes of the present invention at a pressure of greater than osmotic. Reverse osmosis processes in which the present invention is useful include: the separation of water from electrolyte solutions such as sea water, brackish waters, acid mine waters, and industrial brines and bitterns; the separation of organic liquids, the purification and concentration of liquid foods such as citrus juices, beer and syrups; and the purification of liquid wastes such as urine. In these processes, it is contemplated that the membrane composite of this invention may be used in either a plate and frame design or in tubular or spiral configurations.

invention. In each example the ultrathin membrane formed was between .15 and .25 micron (1500–2500 A.) in thickness as measured by infrared absorption techniques[17] or by color interference patterns viewed with oblique light.

The test cell was a non-circulating or batch system of the type shown in U.S. Pat. 3,133,132. The membrane composite was supported by a smooth-calendered wet-strength Kraft paper which in turn was supplied mechanical support by a ¼-inch porous sintered stainless steel plate. The system was pressurized with nitrogen and runs were conducted with a 3.5 wt. percent NaCl brine at 1500 p.s.i. The effluent from the cell was led out of the cell by a hyperdermic needle and stored in pipettes.

Membrane constants for the ultrathin membranes of the following example are tabulated in Table 1.

EXAMPLE 1

A solution of 1 part Eastman Kodak cellulose acetate E–394–60, 20 parts cyclohexanone and 1 part water was prepared and was cast on deionized water at 130° F. and annealed at 176° F. for 30 minutes.

Meanwhile, a porous support membrane was formed by casting a mixture containing 11.1 parts Eastman Kodak E–394–60 cellulose acetate, 6.6 parts of acetone, 10.0 parts of water and 5.5 parts magnesium perchlorate on a solid substrate into layer 10-mil-thick at −10° C. This film was immediately immersed in ice water, with no evaporation step. After soaking for one hour in ice water, the membrane was stripped off its substrate and stored in water at room temperature. The finished thickness of this support was between 3.5 and 4 mils. The ultrathin membrane was then laminated to the porous support membrane and placed in the test cell. Lamination was accomplished by first placing the porous support on a piece of rigid composition board, immersing the porous support and board beneath the ultrathin membrane which was floating on water, bringing one edge of the porous support into contact with an edge of the ultrathin membrane, and then drawing the board out of the water at an acute angle.

EXAMPLE 2

An ultrathin membrane was formed by casting a mixture of 9 parts Eastman E–394–60 cellulose acetate, 1 part acetylated hydroxyethyl cellulose and 200 parts of cyclohexanone on water at 130° F. and then annealing at 170° F. for 30 minutes.

This membrane was laminated with a cellulose acetate support as described in Example 1 and placed in the test cell.

EXAMPLE 3

Guar gum (10 gm. of General Mills "Guartec UF") was dispersed in a liter of water by mixing five to ten minutes in a Waring Blendor. The dispersion was heated three hours in a pressure cooker at 120 p.s.i., cooled, and the "guaran" precipitated by addition of 1 liter by 95% ethanol. The precipitate was washed with pyridine on a sintered glass filter to replace the ethanol. Then 225 ml. of pyridine plus 75 ml. of acetic anhydride were added, and the mixture was stirred 24 hours at 100° C. to give a dark solution. The solution was poured slowly into a liter of cold water to precipitate guar triacetate, which was washed thoroughly and dried at 60° C. A 1% solution of guar triacetate in 500 ml. of 95/5 acetone/water was prepared, and 230 ml. of 75/25 hexane/acetone was added slowly. Cooling to −10° C. precipitated 63% of the polymer. Addition of hexane to the supernatant liquid gave a second fraction of 31%.

One part of a high molecular weight fraction of guar triacetate was mixed with 20 parts of cyclohexanone and cast on water at 75° F. and subsequently allowed to evaporate to form a membrane. This ultrathin membrane was laminated with the type of support prepared in Example 1 and placed in the test cell.

EXAMPLE 4

Locust bean gum (Stein Hall Company) was acetylated in two to three minutes using acetic anhydride with a perchloric acid catalyst at room temperature in a Waring Blendor. The product, 44.3% acetyl, was fractionated ---
[15] Reference 11 supra.
[16] Johnson et al., "Hyperfiltration" (reverse osmosis) at p. 416, in Spiegler, Principles of Desalination, Academic Press, New York (1966).
[17] Reference 11 supra at p. 9.

by the method described in Example 3 above, giving 76% of the material in the first fraction and 24% in the second fraction. 1 part of the low molecular weight fraction of locust bean gum triacetate was mixed with 20 parts cyclohexanone, cast on water at 75° F. and allowed to evaporate. The resulting ultrathin membrane was supported on a porous support membrane made as described in Example 1 and placed in the test cell.

EXAMPLE 5

5 gms. of a purified beta-glucan (scloroglucan), marketed by the Pillsbury Company, Minneapolis, Minn., under the trade name "Polytetran," was mixed in 500 ml. of water in a Waring Blendor for 15 minutes. During this time the temperature increased to 70 to 80° C. and resulted in a clear thick gel. The gel was precipitated with 400 ml. of acetone, washed with acetone on a sintered glass filter, then washed three times with glacial acetic acid. The filter cake was milled several minutes in a blender in 100 ml. glacial acetic acid to give a fine suspension; perchloric acid (0.5 ml. of 60% solution) was added with mixing and was followed by 30 ml. of acetic anhydride. In about 30 seconds, a thick, clear gel formed, and the temperature increased to 50° C. This was allowed to stand 80 minutes at room temperature to reduce the polymer molecular weight to a point where the solution had a syrupy consistency. The resulting beta-glucan triacetate was precipitated by pouring slowly into a liter of cold water. The product was milled in a blender, neutralized with sodium acetate, washed thoroughly with water, and dried at 50° C. The product was then fractionated by the method of Example 3 above, giving 45% of product in the first fraction and 48% in the second fraction.

One part of a high molecular weight fraction of beta-glucan triacetate was mixed with 40 parts of cyclohexanone and subsequently cast on water at 75° F. and allowed to evaporate to form an ultrathin membrane. This membrane was then composited with a porous cellulose acetate support membrane as described in Example 1 and placed in a test cell.

EXAMPLE 6

Xylan was acetylated by the method of Huseman et al.[18] The reaction at room temperature gave an acetyl content of 38.4%.

One part of this xylan diacetate, not fractionated, was mixed with 20 parts of a 90/10 solution of dichloromethane/methanol, cast on water at 130° F. and allowed to evaporate forming an ultrathin membrane. This membrane was laminated with the type of cellulose acetate porous support described in Example 1 and was then placed in the test cell.

EXAMPLE 7

Cotton linters (10 g. of Hercules A-2000 fiber) were soaked in water for 24 hours. The fiber was filtered, and the water was displaced by washing three times with glacial acetic acid on a sintered glass filter. Then the fiber was added to a mixture of 100 ml. of toluene and 80 ml. of glacial acetic acid. Sixty percent perchloric acid (0.6 ml.) was added, followed by 50 ml. of acetic anhydride. The fiber slurry was allowed to stand one hour at room temperature with occasional stirring. Then the fiber was filtered, washed with methanol, and slurried in water containing 2 to 3 g. of sodium acetate to neutralize residual perchloric acid. The fiber was further washed with water and dried at 50° C. The acetyl content was 44.5%.

One part of the above prepared cellulose triacetate was mixed with 20 parts of a 90/10 solution of dichloromethane/methanol. An equal volume of 90/10 cyclohexanone/dimethyl formamide was added and the dichloromethane and methanol were evaporated by heating at 75° F. This mix was then cast on water at 75° F. and allowed to evaporate to form an ultrathin membrane which was laminated with a porous support as in Example 1. The composite was then placed in a test cell.

EXAMPLE 8

Xylan diacetate was prepared as in Example 6 and cellulose triacetate was prepared as in Example 8.

One part of a 1/1 mix of xylan diacetate and cellulose triacetate was mixed with 20 parts of 90/20 dichloromethane/methanol. The resulting mixture was cast on water at 75° F. and allowed to evaporate to form an ultrathin membrane which was then laminated to a porous cellulose acetate support as described in Example 1. The resulting composite membrane was then placed in the test cell.

EXAMPLE 9

Methyl cellulose (5 g., Fisher 100 cps.) was dispersed in 100 ml. of glacial acetic acid at room temperature. Then, 0.21 g. of 60% perchloric acid and 25 ml. of acetic anhydride were added. In two minutes the methyl cellulose dissolved to give a clear solution. The methyl cellulose acetate formed by the reaction was quickly quenched by pouring into ice water. The product was washed with water, neutralized to a pH of 6 with sodium carbonate, water washed and dried at 75° C. The acetyl content of the product methyl cellulose acetate was 24.4%.

One part of this methyl cellulose acetate was mixed with 20 parts of cyclohexanone, cast on water at 75° F. and allowed to evaporate to form an ultrathin membrane. This was then laminated to a cellulose acetate porous support membrane as in Example 1 and place in the test cell.

EXAMPLE 10

Five grams of Fisher 100 cps. methyl cellulose was dispersed in 100 ml. of acrylonitrile, and 9 drops of 33% sodium hydroxide were added. The mixture was heated under reflux for 15 minutes to give a yellow solution. The product methyl cyanoethyl cellulose was precipitated in water, neutralized with acetic acid, washed and air dried.

One part of the thus produced methyl cyanoethyl cellulose was mixed with 20 parts cyclohexanone, cast on water at 75° F. and allowed to evaporate to form an ultrathin membrane. That membrane was laminated with a porous cellulose acetate support membrane as in Example 1 and placed in the test cell.

EXAMPLE 11

Five grams of Eastman 360-60 cellulose acetate was dried at 110° C. and dissolved in 100 ml. of pyridine. The solution was cooled to −10° C., and 10 ml. of methyl chloroformate was added dropwise to produce an exothermic reaction. The solution was allowed to stand for 72 hours, and the cellulose acetate methyl carbonate product was precipitated in water, washed and air dried.

One part of the above produced cellulose acetate methyl carbonate was mixed with 20 parts of a 90/10 cyclohexanone/dimethylformamide solution and subsequently cast on water at 75° F. and allowed to evaporate to form as ultrathin membrane. This membrane was then laminated with a Gelman Metricel GA-10 (cellulose triacetate) porous support. The resulting composite membrane was then positioned in the test cell.

EXAMPLE 12

Using the method of Izard et al.[19], 10 grams of Eastman 360-60 cellulose acetate was dried at 110° C. and heated for four hours under reflux with 12 g. of chloroacetic anhydride in 100 ml. of toluene. The cellulose acetate chloroacetate product was filtered, washed with methanol, and dried at 50° C.

One part of the above produced cellulose acetate chloroaceate was mixed with 20 parts of cyclohexanone and cast

---

[18] Huseman et al., Die Makromolekulare Chemie, p. 232 (March 1956), and Huseman et al., ibid., vol. 25, p. 146 (1958).

[19] Izard et al., Ind. Eng. Chem., vol. 41, p. 617 (1949).

on water at 75° F. The cast was then allowed to evaporate to form an ultrathin membrane. This membrane was laminated with a porous support as in Example 1 and placed in a test cell.

EXAMPLE 13

Ten grams of Eastman 435-3 cellulose acetate was dissolved in 100 ml. of dioxane and 50 ml. of ethyl lactate plus one ml. of 60% perchloric acid were added. The solution was held two days at room temperature, and the cellulose acetate lactate product was isolated by precipitating in water, washing with water and methanol, and drying at room temperature.

One part of the above produced cellulose acetate lactate was mixed with 20 parts cyclohexanone, cast on water at 75° F., and allowed to evaporate to form an ultrathin membrane. This membrane was laminated onto a cellulose acetate porous support membrane as in Example 1 and placed in the test cell.

EXAMPLE 14

Twenty ml. (0.223 mole) of methoxyacetic acid was mixed 20 ml. (0.168 mole) of thionyl chloride and heated to 105° C. to give methoxyacetyl chloride. This was cooled and added to 100 ml. of pyridine containing 5 g. of Eastman 360-60 cellulose acetate. After an exothermix reaction lasting one-half hour, the cellulose acetate methoxyacetate product was isolated by pouring into cold water. It was then washed with water and methanol, and air dried.

One part of the above produced cellulose acetate methoxyacetate was mixed with 20 parts cyclohexanone, cast on water at 75° F. and allowed to evaporate to form an ultarthin membrane. This membrane was laminated with a porous cellulose acetate support membrane as in Example 1 and placed in the test cell.

EXAMPLE 15

One part of Eastman cellulose acetate (43.5% acetyl) was dissolved in 20 parts 90/10 dichloromethane/methanol, 10 parts of cyclohexanone was then added and the dichloromethane was distilled off. The resulting solution was cast on water at 75° F. and allowed to evaporate to form an ultrathin membrane which was then laminated to a porous cellulose acetate support membrane as in Example 1 and placed in the test cell.

EXAMPLE 16

Five parts of cellulose triacetate prepared as in Example 7 above was dissolved in 50 parts of a 45/5 mixture of dichloromethane/methanol, then 50 parts of cyclohexanone was added and cast on water at 75° F. to form an ultrathin membrane which was laminated to a porous cellulose acetate support membrane as in Example 1 and placed in the test cell.

TABLE 1

| Example number | Composition | A, gm cm.$^2$-sec.-atm. | A/H, gm cm.-atm |
|---|---|---|---|
| 1 | Cellulose acetate | $2.42 \times 10^{-6}$ | .127 |
| 2 | 9/1 mix of cellulose acetate and acetylated hydroxyethyl cellulose. | $1.68 \times 10^{-6}$ | .322 |
| 3 | Guar triacetate | $1.02 \times 10^{-6}$ | .575 |
| 4 | Locust bean gum triacetate | $1.47 \times 10^{-6}$ | .520 |
| 5 | Beta-glucan triacetate | $2.25 \times 10^{-6}$ | .350 |
| 6 | Xylan diacetate | $1.81 \times 10^{-6}$ | .489 |
| 7 | Cellulose triacetate | $1.42 \times 10^{-6}$ | 4.53 |
| 8 | 1/1 mix of xylan diacetate | $1.41 \times 10^{-6}$ | 1.50 |
| 9 | Methyl cellulose acetate | $1.64 \times 10^{-6}$ | .247 |
| 10 | Methyl cyanoethyl cellulose | $1.17 \times 10^{-6}$ | .341 |
| 11 | Cellulose acetate methyl carbonate | $2.98 \times 10^{-6}$ | .342 |
| 12 | Cellulose acetate chloroacetate | $1.67 \times 10^{-6}$ | .234 |
| 13 | Cellulose acetate lactate | $1.98 \times 10^{-6}$ | .526 |
| 14 | Cellulose acetate methoxyacetate | $1.22 \times 10^{-6}$ | 2.22 |
| 15 | Cellulose acetate (43.5% acetyl) | $1.51 \times 10^{-6}$ | 4.53 |
| 16 | Cellulose triacetate | $1.77 \times 10^{-6}$ | 4.53 |

These examples show that the ultrathin membrane and the composite of an ultrathin membrane and a porous support are useful as reverse osmosis membranes when constructed from a variety of materials.

While there has been described preferred embodiments of the invention, it will be readily appreciated that many adaptations, variations and modifications are possible within the spirit and scope of the invention.

What is claimed is:

1. An ultrathin semipermeable reverse osmosis membrane consisting of a polysaccharide having a thickness between 0.05 and 0.50 micron.

2. The membrane of claim 1 wherein the thickness of said membrane is in the range of from 0.10 to 0.25 micron.

3. The membrane of claim 1 having an "A" constant of at least $1 \times 10^{-6}$ gm./cm.$^2$-sec.-atm. and an "$A/B$" ratio of at least 0.1 gm./cm.-atm. as measured in a 3.5% aqueous solution of NaCl at 1500 p.s.i.

4. The membrane of claim 1 wherein said polysaccharide is a cellulosic ester.

5. The membrane of claim 1 wherein said polysaccharide is a member of the group consisting of cellulose aceate, cellulose diacetate, cellulose triacetate, guar triaceate, locust bean gum triacetate, xylan diacetate, methyl cellulose acetate, methyl cyanoethyl cellulose, cellulose acetate methyl carbonate, cellulose acetate chloroacetate, cellulose acetate lactate and cellulose acetate methoxy acetate.

6. A composite reverse osmosis membrane consisting of a first discrete lamina of an ultrathin semipermeable polysaccharide reverse osmosis membrane having a thickness of from 0.05 to 0.50 micron and a second discrete lamina consisting of a porous support membrane having a thickness of from about 1 to 20 mils and a pore size at one surface thereof of less than about 5000 A., said ultrathin membrane being separately formed and then laminated to said porous membrane at said surface.

7. The composite membrane of claim 6 wherein the thickness of said ultrathin membrane is in the range of from 0.10 to 0.25 micron.

8. The composite membrane of claim 6 having an "A" constant of at least $1 \times 10^{-6}$ gm./cm.-sec.-atm. and an "$A/B$" ratio of at least 0.1 gm./cm.-atm. as measured in a ⅗% aqueous solution of NaCl at 1500 p.s.i.

9. The composite membrane of claim 6 wherein said polysaccharide is a member of the group consisting of cellulose acetate, cellulose diacetate, cellulose triacetate, guar triacetate, locust bean gum triacetate, xylan diacetate, methyl cellulose acetate, methyl cyanoethyl cellulose, cellulose acetate methyl carbonate, cellulose acetate lactate, and cellulose acetate methoxy acetate.

10. The composite membrane of claim 6 wherein said porous support membrane is made from a member selected from the group consisting of a polysaccharide, mixtures of polysaccharides, a metal, and a ceramic.

11. The composite membrane of claim 6 wherein said polysaccharide is a cellulosic ester.

12. The composite membrane of claim 11 wherein said porous support membrane is made from a polysaccharide.

13. In a process of removing a portion of solvent from a solution by contacting a semipermeable membrane with said solution at a pressure above the osmotic pressure of said solution the improvement comprising using a membrane comprising an ultrathin semipermeable polysaccharide membrane having a thickness of from 0.05 to 0.50 micron as said semipermeable membrane.

14. The process of claim 13 wherein said ultrathin semipermeable polysaccharide membrane is separately formed and then laminated to a porous support membrane.

15. The process of claim 13 wherein said solution is an aqueous electrolyte.

16. The process of claim 15 wherein said aqueous electrolyte is selected from the group consisting of sea water, brackish water, and acid mine water.

17. The process of claim 13 wherein the thickness of said ultrathin semipermeable polysaccharide membrane is in the range of from 0.10 to 0.25 micron.

References Cited

UNITED STATES PATENTS

| | | | |
|---|---|---|---|
| 1,920,118 | 7/1933 | Walsh et al. | 264—298X |
| 2,738,025 | 3/1956 | Annas | 264—298X |
| 2,960,462 | 11/1960 | Lee et al. | 208—308 |
| 3,228,877 | 1/1966 | Mahon | 210—321X |
| 3,246,764 | 4/1966 | McCormack | 210—321 |
| 3,276,598 | 10/1966 | Michaels et al. | 210—500 |
| 3,276,996 | 10/1966 | Lazare | 210—22 |
| 3,367,787 | 2/1968 | Thijsseh et al. | 210—22X |

OTHER REFERENCES

1964, Saline Water Conversion Report, for sale by Supt. of Documents, Washington, D.C., published July 14, 1965, 279 pages, pp. 37–39 relied on.

FRANK A. SPEAR, Jr., Primary Examiner

U.S. Cl. X.R.

210—321, 490